(12) United States Patent
Gutierrez

(10) Patent No.: US 8,468,875 B1
(45) Date of Patent: Jun. 25, 2013

(54) PIPE LEAKAGE DETECTING SYSTEM

(76) Inventor: Ezequiel Gutierrez, Ontario, CA (US)

( * ) Notice: Subject to any disclaimer, the term of this patent is extended or adjusted under 35 U.S.C. 154(b) by 552 days.

(21) Appl. No.: 12/770,308

(22) Filed: Apr. 29, 2010

(51) Int. Cl.
*G01M 3/04* (2006.01)

(52) U.S. Cl.
USPC ........................................................ 73/40.5 A

(58) Field of Classification Search
USPC ............................................................ 73/40
See application file for complete search history.

(56) References Cited

U.S. PATENT DOCUMENTS

| | | |
|---|---|---|
| 4,368,640 A | 1/1983 | Tokarz |
| 5,131,264 A | 7/1992 | Jensen |
| 5,695,113 A * | 12/1997 | Rau et al. ..................... 232/34 |
| 5,927,142 A | 7/1999 | Mercer |
| 6,414,598 B2 | 7/2002 | Freill et al. |
| 6,851,314 B2 | 2/2005 | Bromley |
| D511,703 S | 11/2005 | Moyer |
| 2006/0267756 A1 * | 11/2006 | Kates ......................... 340/521 |

* cited by examiner

*Primary Examiner* — David A Rogers
*Assistant Examiner* — Alex Devito

(57) ABSTRACT

A pipe leakage detecting system includes a sink mounted on a wall. A plurality of pipes is fluidly coupled to the sink. A housing is mounted on the dwelling wall and is positioned below the pipes. The housing has a bottom wall and a perimeter wall that is attached to and extends upwardly from the bottom wall. The perimeter wall has an upper edge defining an opening into the housing. A weight sensor is mounted in the housing. A sound emitter is electrically coupled to the weight sensor and emits an audible sound when the weight sensor detects weight from water falling onto the weight sensor.

5 Claims, 5 Drawing Sheets

PIPE LEAKAGE DETECTING SYSTEM

BACKGROUND OF THE DISCLOSURE

Field of the Disclosure

The disclosure relates to pipe leak detecting devices and more particularly pertains to a new pipe leak detecting device for alerting a person when a pipe is leaking.

SUMMARY OF THE DISCLOSURE

An embodiment of the disclosure meets the needs presented above by generally comprising a sink mounted on a wall. A plurality of pipes is fluidly coupled to the sink. A housing is mounted on the dwelling wall and is positioned below the pipes. The housing has a bottom wall and a perimeter wall that is attached to and extends upwardly from the bottom wall. The perimeter wall has an upper edge defining an opening into the housing. A weight sensor is mounted in the housing. A sound emitter is electrically coupled to the weight sensor and emits an audible sound when the weight sensor detects weight from water falling onto the weight sensor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
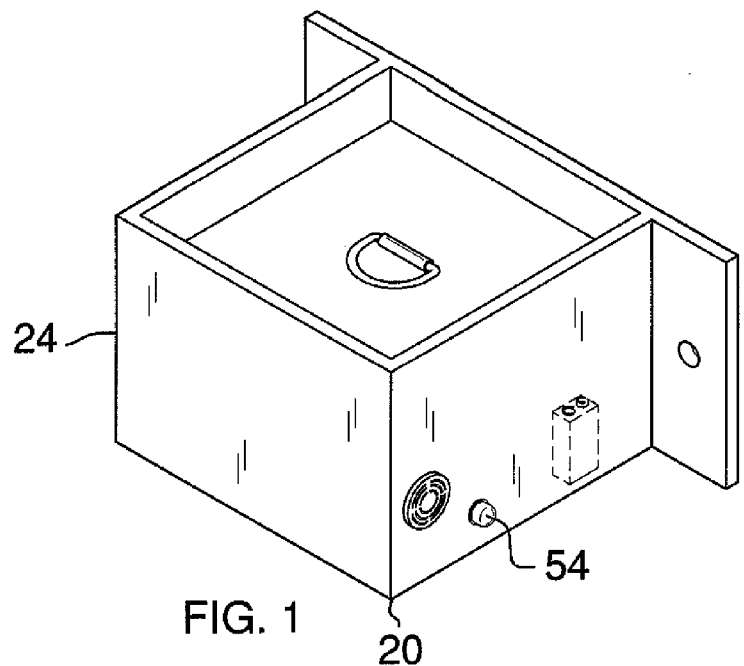
FIG. 1 is a top perspective view of a pipe leakage detecting system according to an embodiment of the disclosure.
Figure 2:
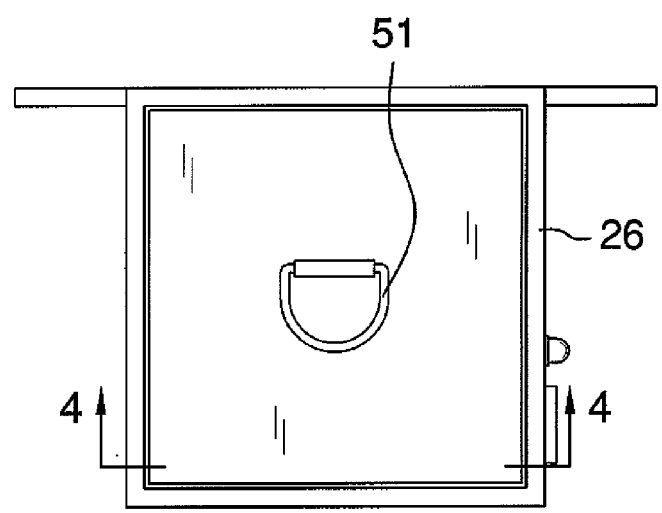
FIG. 2 is a top view of an embodiment of the disclosure.
Figure 7:
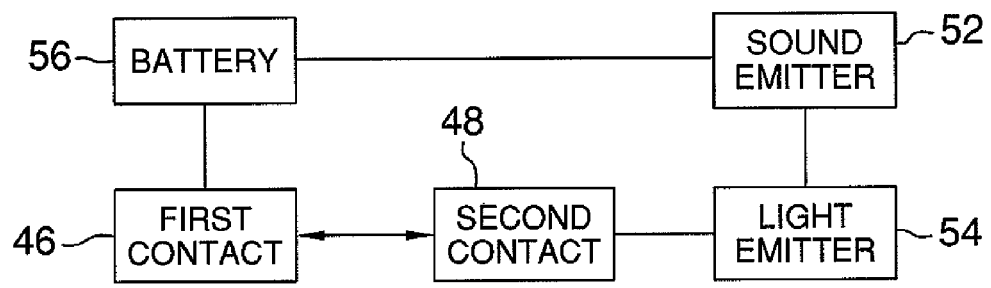
FIG. 7 is a schematic view of an embodiment of the disclosure.
Figure 3:
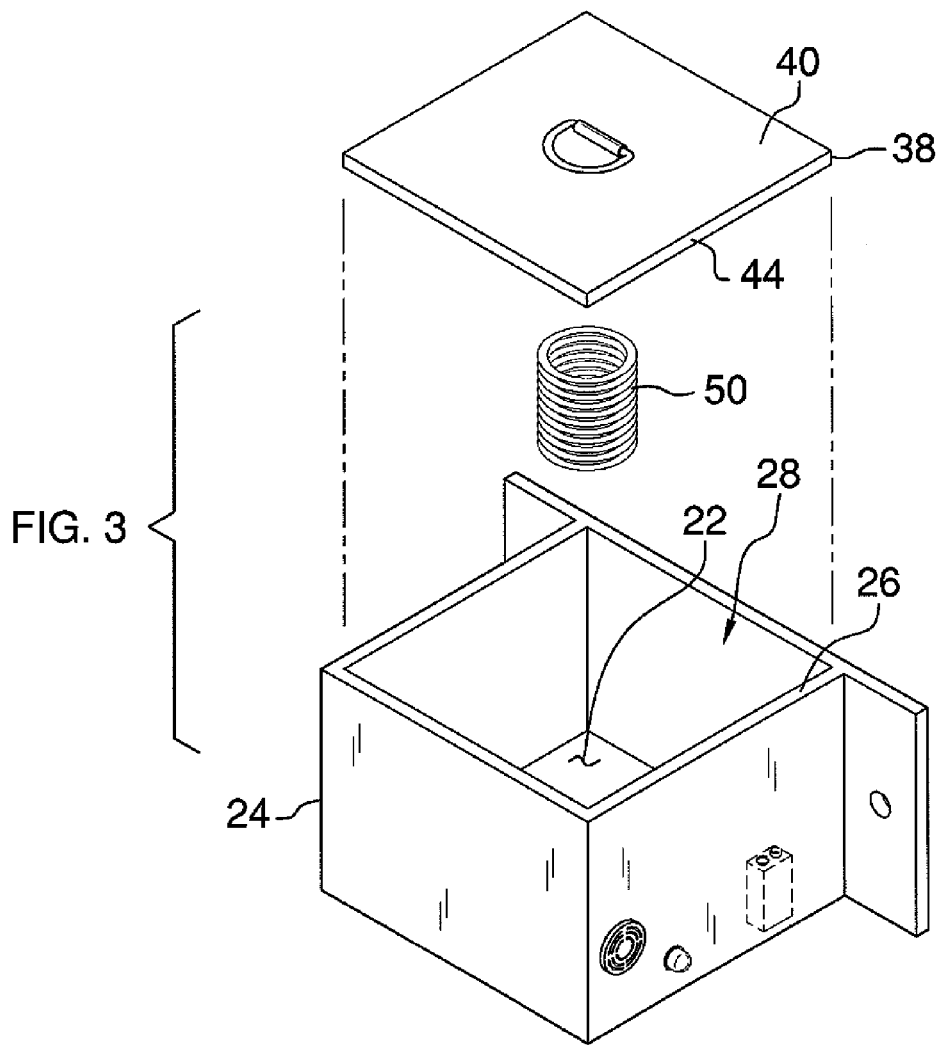
FIG. 3 is a perspective exploded view of an embodiment of the disclosure.
Figure 4:
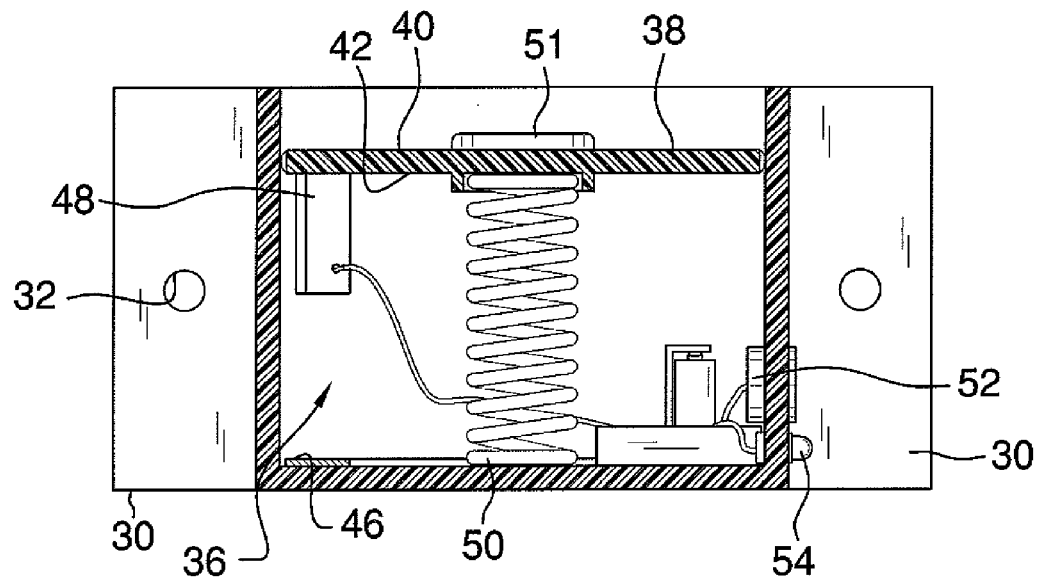
FIG. 4 is a cross-sectional view of an embodiment of the disclosure taken along line 4-4 of FIG. 2.
Figure 5:
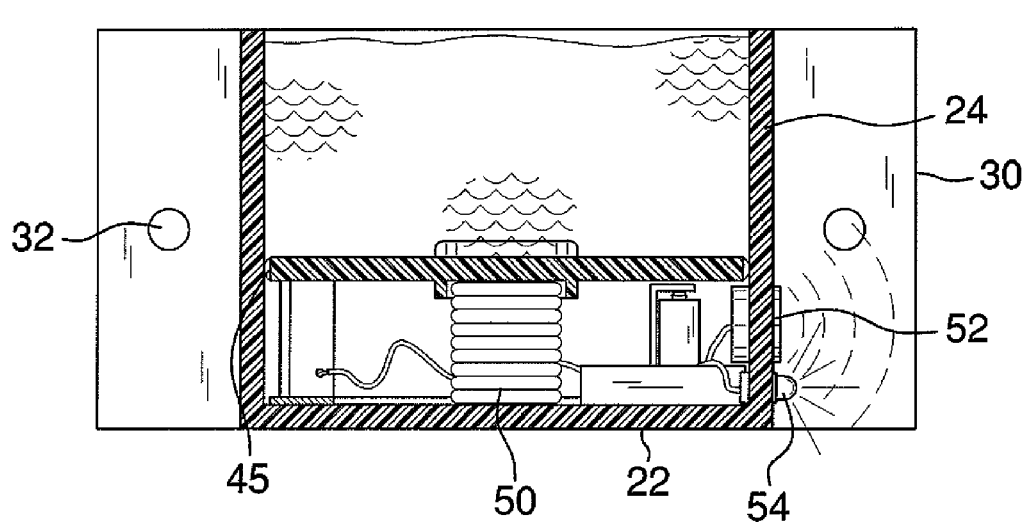
FIG. 5 is a cross-sectional view of an embodiment of the disclosure.
Figure 6:
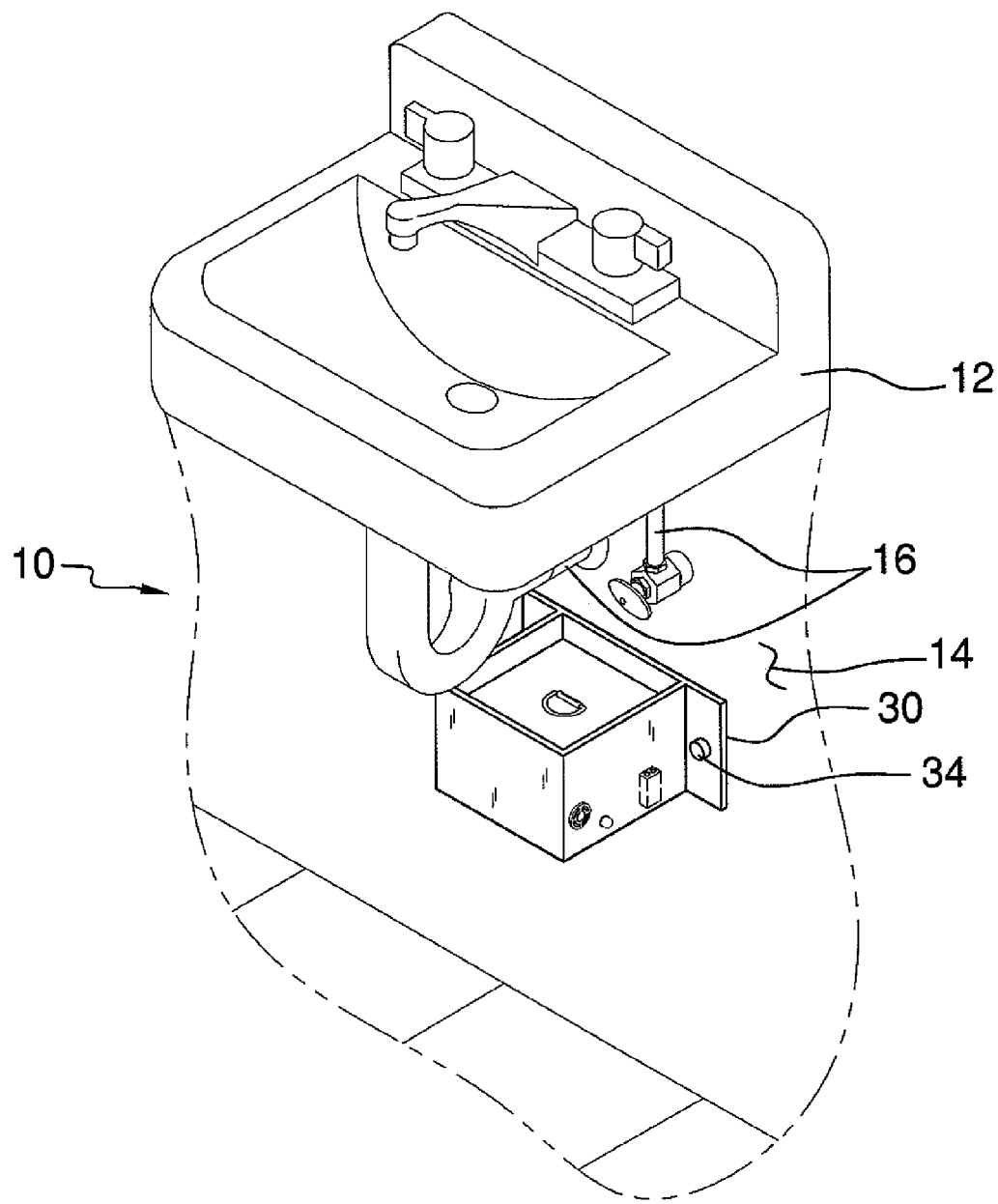
FIG. 6 is a top perspective view of an embodiment of the disclosure.

With reference now to the drawings, and in particular to FIGS. 1 through 8 thereof, a new pipe leak detecting device embodying the principles and concepts of an embodiment of the disclosure and generally designated by the reference numeral 10 will be described.

As best illustrated in FIGS. 1 through 8, the pipe leakage detecting system 10 generally comprises a sink 12 mounted on a dwelling wall 14. A plurality of pipes 16 is fluidly coupled to the sink. The pipes 16 would include conventional supply and drain pipes.

A housing 20 is mounted on the dwelling wall 14 and is positioned below the pipes 16. The housing 20 has a bottom wall 22 and a perimeter wall 24 that is attached to and extends upwardly from the bottom wall 22. The perimeter wall 24 has an upper edge 26 that defines an opening 28 into the housing 20. A plurality of flanges 30 is attached to the housing 20. The flanges 30 have openings 32 therein to receive fasteners 34 for mounting the housing 20 to the dwelling wall 14. The flanges 30 each extend laterally away from a back wall of said housing 20.

A weight sensor 36 is mounted in the housing 20. The weight sensor 36 includes a panel 38 that has a top side 40, a bottom side 42 and a perimeter edge 44. The panel 38 is mounted in the housing 20 and the perimeter edge 44 abuts and forms a seal with an interior surface of the perimeter wall 24 by way of a sealing member 45 attached to the perimeter edge 44. The top side 40 facing upwardly and the panel 38 is vertically movable within the housing 20. A first contact 46 is mounted within a cavity defined between the panel 38 and the bottom wall 22. A second contact 48 is mounted on the bottom side 42. The first 46 and second 48 contacts abut each other and form a closed circuit when the panel 38 is urged downwardly toward the bottom wall 22. A biasing member 50 is mounted in the cavity and biases the panel 38 away from the bottom wall 22. The biasing member 50 retains the first 46 and second 48 contacts in a spaced relationship with each other until weight on the panel 38 urges the panel 38 toward the bottom wall 22. The biasing member 50 comprises a spring and may have a tension determined by the amount of weight selectively required to move the panel 38 downwardly within the housing 20. A grip 51 is attached to the panel 38 to remove the panel 38 if needed.

A sound emitter 52 is electrically coupled to the weight sensor 36. The sound emitter 52 emits an audible sound when the weight sensor 36 detects weight from water falling onto the weight sensor 36. More particularly, electricity is supplied to the sound emitter 52 when the circuit is closed to cause the sound emitter 52 to emit the audible sound.

A light emitter 54 is mounted on the housing 20 and is electrically coupled to the weight sensor 36. The light emitter 54 emits light when the weight sensor 36 detects weight falling onto the weight sensor 36. As with the sound emitter 52, the light emitter 54 emits the light when the circuit is closed. A battery 56 is mounted in the housing and is electrically coupled the first 46 and second 48 contacts.

Figure 8:
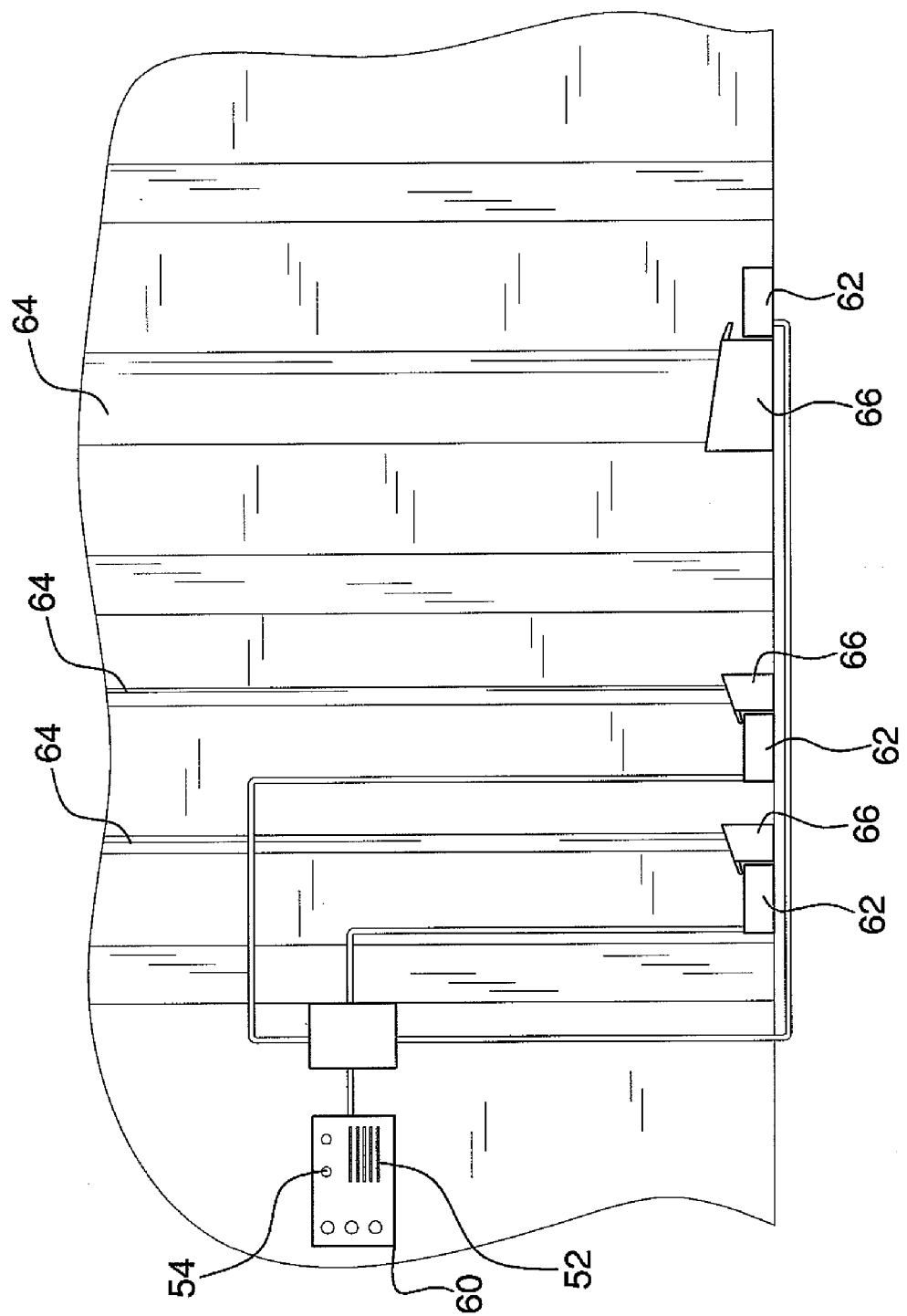
FIG. 8 is a side view of an embodiment of the disclosure.

FIG. 8 depicts an embodiment wherein the first 46 and second 48 contacts are placed in housings 62 in a manner described above, however, the light emitter 54 and sound emitter 52 are mounted on a panel 60 positioned away from the housings 20. The first 46 and second 48 contacts of each of the housings 62 are electrically coupled to the panel 60 to allow for one panel 60 utilizing a plurality of leak detection devices. These housings 62 are mounted within walls and adjacent to fluid holding pipes 64 such as hot water supply pipes, cold water supply pipes and drainage pipes. Sleeves 66 are mounted on the pipes 64 to direct water into the housings 62. In this manner, if there is any leakage from the pipes 62, the sound emitter 52 and light emitter 64 on the panel will warn of hidden leaks.

In use, the housing 20 is mounted to the dwelling wall 14 under the sink 12 so that it will capture any water that drips from or leaks from the pipes 16. If a small amount of water falls into the housing 20, such as from condensation on the pipes 16, the weight sensor 36 will not activate the sound emitter 52. However, during a larger leak, the weight of the water will cause the circuit to be closed to turn on the sound 52 and light 54 emitters.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A leakage detection system comprising:
   a sink mounted on a dwelling wall, a plurality of pipes being fluidly coupled to said sink;
   a housing being mounted on said dwelling wall and being positioned below said pipes, said housing having a bottom wall and a perimeter wall being attached to and extending upwardly from said bottom wall, said perimeter wall having an upper edge defining an opening into said housing;
   a weight sensor being mounted in said housing wherein said weight sensor includes a panel mounted in said housing;
   a grip coupled to said panel wherein said grip is configured to remove said panel from said housing; and
   a sound emitter being electrically coupled to said weight sensor, said sound emitter emitting an audible sound when said weight sensor detects weight from water falling onto said weight sensor.

2. The system according to claim 1, further comprising said panel having a top side, a bottom side and a perimeter edge, said perimeter edge abutting and forming a seal with an interior surface of said perimeter wall, said top side facing upwardly.

3. The system according to claim 2, wherein said weight sensor further includes:
   a first contact being mounted within a cavity defined between said panel and said bottom wall;
   a second contact being mounted on said bottom side, said first and second contacts abutting each other and forming a closed circuit when said panel is urged downwardly toward said bottom wall; and
   a biasing member being mounted in said cavity and biasing said panel away from said bottom wall, said biasing member retaining said first and second contacts in a spaced relationship with each other until weight on said panel urges said panel toward said bottom wall.

4. The system according to claim 1, further including a light emitter being mounted on said housing and being electrically coupled to said weight sensor, said light emitter emitting light when said weight sensor detects weight falling onto said weight sensor.

5. A leakage detection system comprising:
   a sink mounted on a dwelling wall, a plurality of pipes being fluidly coupled to said sink;
   a housing being mounted on said dwelling wall and being positioned below said pipes, said housing having a bottom wall and a perimeter wall being attached to and extending upwardly from said bottom wall, said perimeter wall having an upper edge defining an opening into said housing, a plurality of flanges being attached to said housing, said flanges having openings therein to receive fasteners for mounting said housing to said dwelling wall;
   a weight sensor being mounted in said housing, said weight sensor including;
      a panel having a top side, a bottom side and a perimeter edge, said panel being mounted in said housing and said perimeter edge abutting and forming a seal with an interior surface of said perimeter wall, said top side facing upwardly;
      a first contact being mounted within a cavity defined between said panel and said bottom wall;
      a second contact being mounted on said bottom side, said first and second contacts abutting each other and forming a closed circuit when said panel is urged downwardly toward said bottom wall;
      a biasing member being mounted in said cavity and biasing said panel away from said bottom wall, said biasing member retaining said first and second contacts in a spaced relationship with each other until weight on said panel urges said panel toward said bottom wall;
   a grip coupled to said panel wherein said grip is configured to remove said panel from said housing;
   a sound emitter being electrically coupled to said weight sensor, said sound emitter emitting an audible sound when said weight sensor detects weight from water falling onto said weight sensor; and
   a light emitter being mounted on said housing and being electrically coupled to said weight sensor, said light emitter emitting light when said weight sensor detects weight falling onto said weight sensor.

* * * * *